H. SCHREINER, Jr.
Harrow.
No. 17,821.
Patented July 14, 1857.
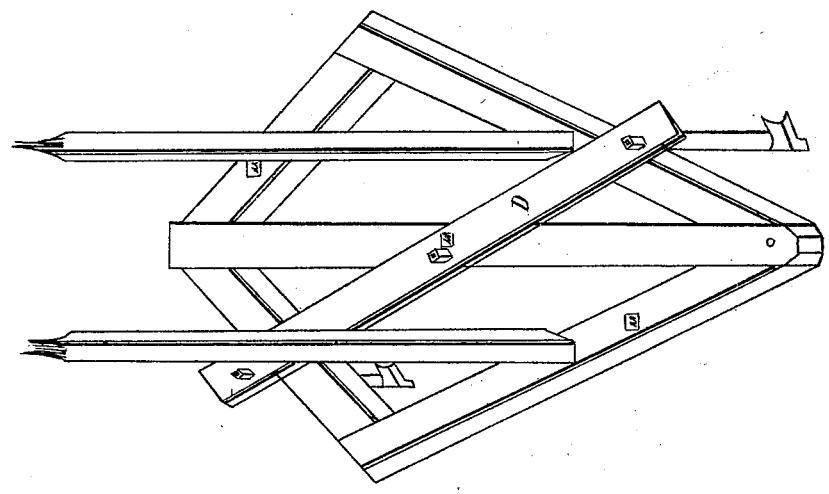
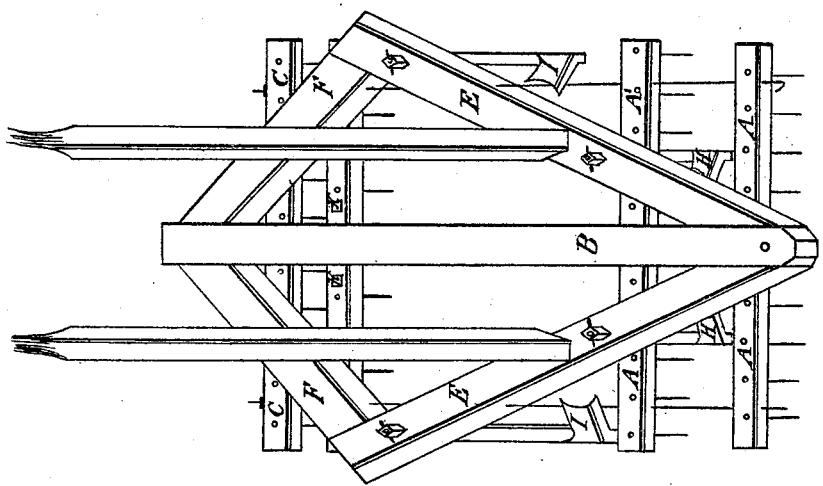
Witnesses:
Geo Sark
Solomon Enterline
Inventor:
Henry Schreiner Jr.

UNITED STATES PATENT OFFICE.

HENRY SCHREINER, JR., OF BERRYSBURG, PA., ASSIGNOR TO HIMSELF AND GEORGE LARK; SAID LARK ASSIGNOR TO HENRY SCHREINER, JR.

IMPROVEMENT IN CULTIVATORS.

Specification forming part of Letters Patent No. 17,821, dated July 14, 1857.

*To all whom it may concern:*

Be it known that I, HENRY SCHREINER, Jr., of Berrysburg, in the county of Dauphin and State of Pennsylvania, have invented a new and useful Implement for Cultivating Corn, Cotton, and Sugar, which I have named "H. Schreiner, Jr.'s, Combined Corn Plow and Harrow"; and to enable others skilled in the art to manufacture and use the same, I do hereby declare that the following is a full, clear, and exact description of the construction and operation of the same, reference being had to the accompanying drawings, with letters of reference marked thereon, making a part of this specification, in which—

Figure 1 is a straddle-plow and harrow, which is constructed by putting four pieces of wood, E E and F F, together in the form of a diamond, with beam B through the center, underneath of which is attached the corn-harrow A A, going in front of the plows, pulverizing the ground, preparing it for the plows to follow. This harrow is fastened to the plow by screws or bolts passing upward through the cooss-bars A A and the diamond-bars E E; also by running two iron rods or wires backward the whole length through A A E E and bolting fast to C C, which is a harrow intended to pulverize the ground after the plows.

The plows H H are fastened to the beams E E just far enough apart to throw the ground up to the row of corn, cotton, &c., on both sides at the same time, holding up instead of breaking down the plant, which is generally done with a single furrow or with two large ones.

The plows I I are placed at such a distance from H H as to turn the ground into their furrows. When the corn or plants become too large to cultivate in this manner the plows I I may be reversed and the plows H H put into the holes K K, also reversed, and you have a plow to go between the rows doing the same amount of work as the other. Then to change it into a seed-plow, the machine still remaining one and the same, the harrows may or may not be detached, as the farmer desires. The plows must all be removed, and two of them, with one extra one, be inserted into the transverse beam D, either right or left handed, as may be preferred. This beam D is fastened on top E E and B, and may remain permanent, if desired.

This seed-plow may also be constructed at a less expense without beam D by inserting the plows in the holes M M M, as seen in Fig. 2.

I am aware that plows similar to mine have been patented, and also harrows. I therefore disclaim the plows separately and the harrow separately; but What I do claim as my invention, and desire to secure by Letters Patent, is—

In connection with the cultivator E E F F, the arrangement of the cross-beams A A' C and the transverse beam D in the manner and for the purpose set forth.

HENRY SCHREINER, JR. [L. S.]

Witnesses:
GEO. LARK,
SOLOMON ENTERLINE.